[11] 3,589,798

[72] Inventor Toshi.
Sakai-shi, Japan
[21] Appl. No. 810,096
[22] Filed Mar. 25, 1969
[45] Patented June 29, 1971
[73] Assignee Minolta Camera Kabushiki Kaisha
Osaka, Japan
[32] Priority Mar. 25, 1968
[33] Japan
[31] 19328/68

[54] WIDE-ANGLE LENS SYSTEM WITH CORRECTED LATERAL ABERRATION
3 Claims, 6 Drawing Figs.
[52] U.S. Cl. .................................................. 350/198, 350/205, 350/214
[51] Int. Cl. .................................................. G02b13/00, G02b 9/00
[50] Field of Search ........................................... 350/198, 205, 214

References Cited
UNITED STATES PATENTS
2,969,713  1/1961  Mukai .................. 350/214
3,132,199  5/1964  Zimmermann et al. .... 350/214
FOREIGN PATENTS
0,475,134  11/1937  Great Britain ............ 350/205

Primary Examiner—David Schonberg
Assistant Examiner—Paul A. Sacher
Attorney—Watson, Cole, Grindle & Watson ABSTRACT: The present invention relates to an extreme wide angle lens system having an angle of coverage of 180° which comprises eleven lens elements including an interchangeable filter. This improved extreme wide angle lens system with sufficient light intensity has a relative aperture of up to F/2.8 with a comparatively small number of compact lens elements and the lateral aberration as well as various aberrations thereof are greatly corrected.

INVENTOR
Toshinobu Ogura
BY Watson, Cole, Grindle + Watson
ATTORNEYS

WIDE-ANGLE LENS SYSTEM WITH CORRECTED LATERAL ABERRATION

BACKGROUND OF THE INVENTION

There were some extreme wide lens systems with an angle coverage of up to 180°. However, such prior lens systems are not very useful in practice because the lens structure has low light intensity owing to a comparatively small relative aperture which results from various problems such as difficulty in correcting the lateral chromatic aberration, the strong residual monochromatic aberration, and the large dimension of lens elements and so forth.

SUMMARY OF THE INVENTION

The prime object of the present invention is to provide an extreme wide-angle lens system with a relative aperture of up to F/2.8 by eliminating the said defects of prior wide-angle lens systems after correcting various aberrations including the lateral chromatic aberration, most difficult to remove, to the same degree as that of usual lens systems.

The second object of the present invention is to provide an extreme wide-angle lens system which is applicable to a 35 mm. single lens reflex camera with no fear of hindering the rotating motion of a reflecting mirror by making the back focal distance over twice the focal length.

The third object of the present invention is to provide an extreme wide-angle lens system by which a field angle of 180° can be mapped on a diagonal in the photographing plane.

DESCRIPTION OF THE PREFERRED EMBODIMENT

Figure 1:
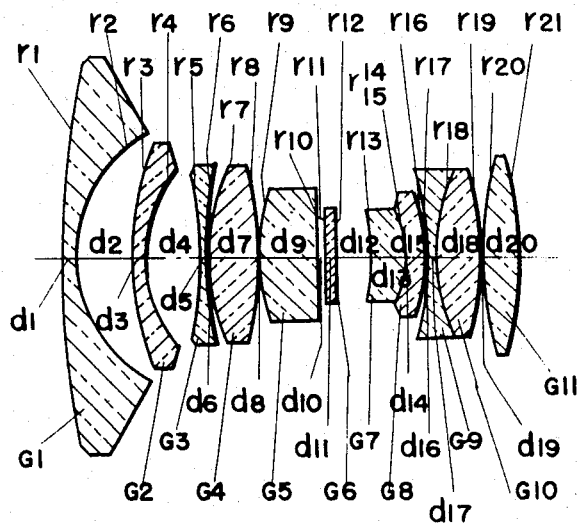
FIG. 1 shows the structure of the first embodiment of the present invention of an extreme wide lens system.
Figure 2:
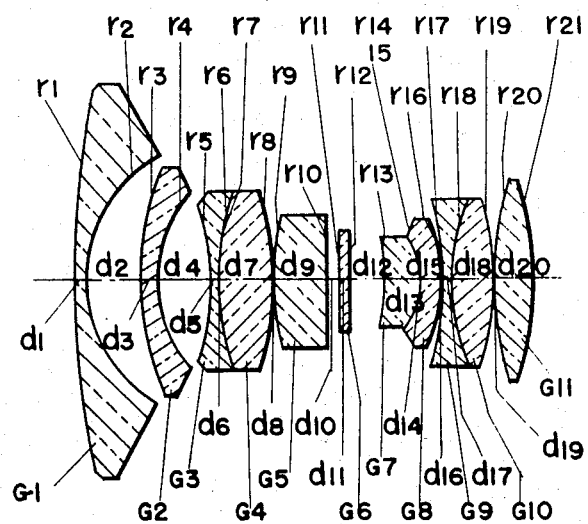
FIG. 2 shows the structure of the second embodiment.
Figure 3:
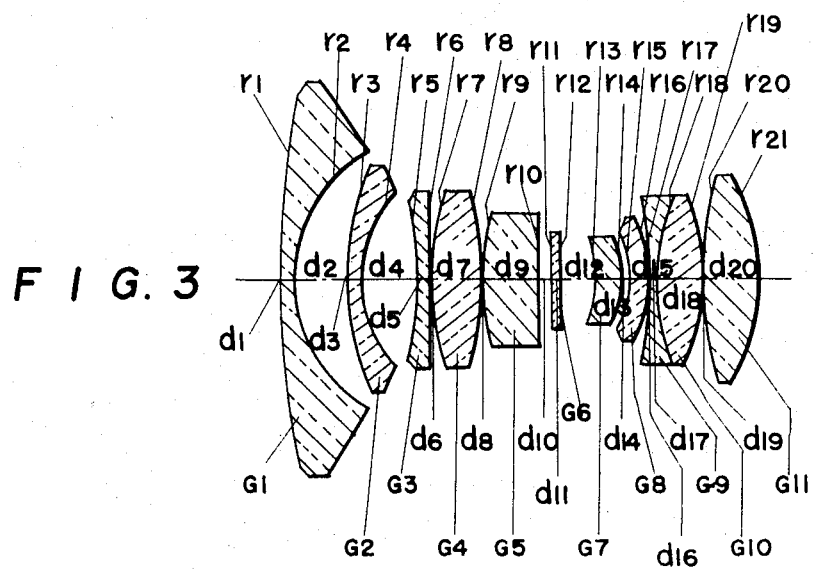
FIG. 3 shows the structure of the third embodiment.

As shown in FIG. 1 through FIG. 3, an extreme wide-angle lens system of the present invention comprises 11 lens elements including an interchangeable filter G6. Both the first lens element G1 and the second lens element G2 are divergent meniscus lenses which are disposed with the convex surfaces facing the object side, the third lens element G3 and the fourth lens element G4 are a divergent lens and a biconvex lens, respectively, which are used either as a cemented doublet or as individual lens elements, the fifth lens element G5 is a convergent lens which is disposed with the convex surface directing to the object side, the sixth lens element G6 is a filter, the seventh lens element G7 and the eighth lens element G8 are a convergent meniscus lens and a divergent meniscus lens, respectively, which are used either as a cemented doublet or as individual lens elements and disposed with the convex surfaces facing to the image side, the ninth lens element G9 and the 10th lens element G10 composing a cemented doublet are a divergent lens and a biconvex lens, respectively, and the 11th lens element G11 is a convergent lens. The said extreme wide lens system satisfies the following conditions.

(a) $$V_1 + V_2 > 105, \quad \frac{V_3}{(V_4 + V_5)} > 0.6$$

(b) $$\frac{(V_7 + V_{11})}{V_s} > 3, \quad V_{10} > V_9$$

(c) $$\frac{N_8 - 1}{r_{15}} - \frac{N_7 - 1}{r_{14}} < \frac{-0.05}{f}$$

(d) $$\frac{r_{16}}{r_{13}} - \frac{r_{19}}{r_{17}} > = 0.2$$

where $r_1, r_2 \ldots$ : the radii of curvature of the refracting surfaces numbered in sequence from the object side, $d_1, d_2 \ldots$ : the axial separations between consecutive refracting surfaces, $N_1, N_2 \ldots$ : the refractive indices of lens elements, $V_1, V_2 \ldots$ : the Abbe numbers of lens elements, $f \ldots$ : the focal length of the whole system.

In the above-mentioned conditions and the embodiments to be mentioned below, the numbering of surfaces is carried out in sequence after splitting the doublet into individual lens elements when the third lens element G3 and the fourth lens element G4 as well as the seventh lens element G7 and the eighth lens element G8 are cemented to be doublets.

The sixth lens element G6 is an interchangeable filter which can be removed from the system when unnecessary, or positioned behind the last lens element G11. Usually, a stop is positioned between the fifth element G5 and the seventh lens element G7.

Characteristics and functions of the structure of the lens system of the present invention will be described in the following.

The first three lens elements are positioned in the front portion of the system in order not to allow an excessive angle of inclination of light pencils introduced at half field angle of 90° or so and to obtain a long back focal distance. In order to reduce the considerable lateral chromatic aberration produced therein as much as possible, it is necessary to dispose two convergent lens elements, the fourth lens element G4 and the fifth lens element G5, between the said three divergent lens elements and the stop which contribute effectively to the correction, and at the same time to require condition (a) on selecting Abbe numbers.

If the condition is not fulfilled, satisfactory correction cannot be attained by any selection of Abbe numbers of the lens elements in the rearward portion of the system.

The condition (b) on the achromatism is necessary for five lens elements in the rearward portion from the stop in order to

EMBODIMENT I

[$f = 1$, 1:2.8, Field angle $2\omega = 180°$, Back focal distance $= 2.28$]

| Radii of curvature | Axial separations | Refractive indices | Abbé numbers |
|---|---|---|---|
| $r_1 = 7.6587$ | $d_1 = 0.13$ | $N_1 = 1.6204$ | $V_1 = 60.3$ |
| $r_2 = 1.1846$ | $d_2 = 0.4889$ | | |
| $r_3 = 2.5078$ | $d_3 = 0.12$ | $N_2 = 1.6204$ | $V_2 = 60.3$ |
| $r_4 = 1.0494$ | $d_4 = 0.4779$ | | |
| $r_5 = -2.6996$ | $d_5 = 0.1$ | $N_3 = 1.6204$ | $V_3 = 60.3$ |
| $r_6 = 6.4885$ | $d_6 = 0.04$ | | |
| $r_7 = 4.5007$ | $d_7 = 0.4151$ | $N_4 = 1.6645$ | $V_4 = 35.9$ |
| $r_8 = -3.0057$ | $d_8 = 0.009$ | | |
| $r_9 = 2.1925$ | $d_9 = 0.4722$ | $N_5 = 1.7330$ | $V_5 = 28.2$ |
| $r_{10} = 347.222$ | $d_{10} = 0.1$ | | |
| $r_{11} = \infty$ | $d_{11} = 0.0933$ | $N_6 = 1.5994$ | $V_6 = 40.8$ |
| $r_{12} = \infty$ | $d_{12} = 0.2983$ | | |
| $r_{13} = -1.6272$ | $d_{13} = 0.3413$ | $N_7 = 1.6214$ | $V_7 = 61.2$ |
| $r_{14} = -0.6060$ | $d_{14} = 0$ | | |
| $r_{15} = -0.6060$ | $d_{15} = 0.1481$ | $N_8 = 1.7330$ | $V_8 = 28.2$ |
| $r_{16} = -1.3364$ | $d_{16} = 0.009$ | | |
| $r_{17} = -9.5039$ | $d_{17} = 0.085$ | $N_9 = 1.7400$ | $V_9 = 37.5$ |
| $r_{18} = 1.5755$ | $d_{18} = 0.415$ | $N_{10} = 1.5688$ | $V_{10} = 56.0$ |
| $r_{19} = -1.9997$ | $d_{19} = 0.009$ | | |
| $r_{20} = 3.3016$ | $d_{20} = 0.265$ | $N_{11} = 1.5168$ | $V_{11} = 64.2$ |
| $r_{21} = -4.1338$ | $\Sigma d = 4.0172$ | | | correct the longitudinal chromatic aberration produced excessively by the selection of Abbe numbers in the front portion from the stop as mentioned above, and to attain a further correction for the residual lateral chromatic aberrations. Since the lens system covers a half field angle as wide as of 90°, the condition (c) gives an effective measure to obtain an appropriate value of the Petzval sum by eliminating a negative tendency of the said sum produced by the intensive divergent lens elements in the front portion of the lens systems and to eliminate the spherical aberration produced by the convergent elements. If the said condition is not fulfilled, at least the correction for the spherical aberration becomes inevitably unsatisfactory. In order to reduce the magnitude of the spherical aberration and the astigmatism as much as possible and to eliminate coma produced in the front portion from the stop, while keeping a long back focal distance, it is necessary to dispose five lens elements in the rearward portion from the stop, and the condition (d) is required for curvature of the said lens elements.

Three embodiments of the present invention based on the above-mentioned conditions are described in the following, where $d=0$ means a cemented doublet.

A filter G6 is sometimes removed or positioned behind the last lens element in practical cases.

EMBODIMENT II

[$f=1$, 1:2.8, Field angle $2\omega=180°$, Back focal distance=2.27]

| Radii of curvature | Axial separations | Refractive indices | Abbé numbers |
|---|---|---|---|
| $r_1=7.5832$ | | | |
| $r_2=1.1870$ | $d_1=0.13$ | $N_1=1.6204$ | $V_1=60.3$ |
| $r_3=2.4787$ | $d_2=0.4909$ | | |
| $r_4=1.0464$ | $d_3=0.12$ | $N_2=1.6176$ | $V_2=52.7$ |
| $r_5=-2.7105$ | $d_4=0.4784$ | | |
| $r_6=4.2057$ | $d_5=0.1$ | $N_3=1.6205$ | $V_3=60.3$ |
| $r_7=4.2057$ | $d_6=0$ | | |
| $r_8=-3.229$ | $d_7=0.4701$ | $N_4=1.7495$ | $V_4=34.9$ |
| $r_9=2.1747$ | $d_8=0.009$ | | |
| $r_{10}=\infty$ | $d_9=0.4745$ | $N_5=1.7330$ | $V_5=28.2$ |
| $r_{11}=\infty$ | $d_{10}=0.1$ | | |
| $r_{12}=\infty$ | $d_{11}=0.0933$ | $N_6=1.5994$ | $V_6=40.8$ |
| $r_{13}=-1.7075$ | $d_{12}=0.2981$ | | |
| $r_{14}=-0.6079$ | $d_{13}=0.3381$ | $N_7=1.6214$ | $V_7=61.2$ |
| $r_{15}=-0.6079$ | $d_{14}=0$ | | |
| $r_{16}=-1.3408$ | $d_{15}=0.1481$ | $N_8=1.7330$ | $V_8=28.2$ |
| $r_{17}=-8.0756$ | $d_{16}=0.009$ | | |
| $r_{18}=1.6141$ | $d_{17}=0.085$ | $N_9=1.7400$ | $V_9=37.5$ |
| $r_{19}=-2.0450$ | $d_{18}=0.395$ | $N_{10}=1.5688$ | $V_{10}=56.$ |
| $r_{20}=3.3647$ | $d_{19}=0.009$ | | |
| $r_{21}=-3.5348$ | $d_{20}=0.28$ | $N_{11}=1.5168$ | $V_{11}=64.2$ |
| | $\Sigma d=4.0336$ | | |

FIG. 1, FIG. 2, and FIG. 3 show the structures of lens systems in the first, the second, and the third embodiments, respectively.

Figure 4:
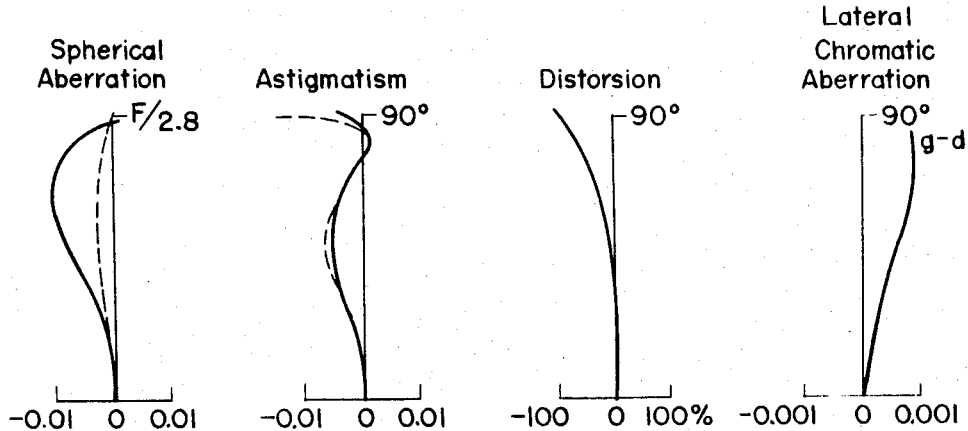
FIG. 4 shows curves of the aberrations in the first embodiment.
Figure 5:
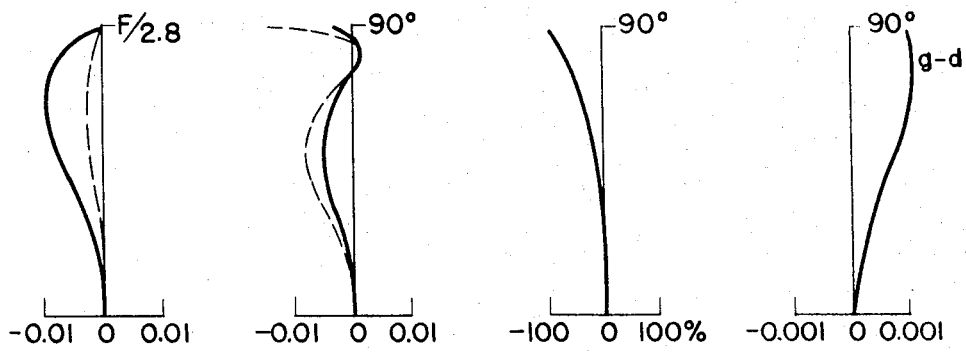
FIG. 5 shows curves of the aberrations in the second embodiment.
Figure 6:
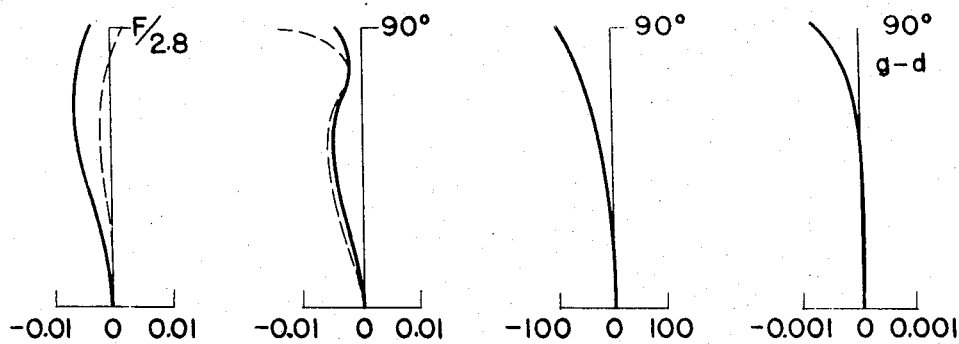
FIG. 6 shows curves of the aberrations in the third embodiment.

FIG. 4, FIG. 5, and FIG. 6 show the behavior of the corrected aberrations in the first, the second, and the third embodiments, respectively, where each aberration is proved to be well corrected in spite of the aperture up to F/2.8 at half field angle of 90°, while keeping a long back focal distance.

Moreover, the lens system comprises a comparatively small number of lens elements and is compact so that it is very useful in practice.

I claim:

1. A wide angle lens system having a focal length of 1.0, a focal aperture of 1:2.8, a field angle of 180° and 11 elements successively mounted from the object side comprising:
   first and second lenses of the divergent meniscus type each having its convex surface facing the object,
   a third lens of the divergent type,

EMBODIMENT III

[$f=1$, 1:2.8, Field angle $2\omega=180°$, Back focal distance=2.19]

| Radii of curvature | Axial separations | Refractive indices | Abbé numbers |
|---|---|---|---|
| $r_1=7.4599$ | | | |
| $r_2=1.1542$ | $d_1=0.13$ | $N_1=1.6000$ | $V_1=64.1$ |
| $r_3=2.4737$ | $d_2=0.5029$ | | |
| $r_4=1.0536$ | $d_3=0.12$ | $N_2=1.6204$ | $V_2=60.3$ |
| $r_5=-2.7204$ | $d_4=0.4796$ | | |
| $r_6=17.2533$ | $d_5=0.1$ | $N_3=1.6204$ | $V_3=60.3$ |
| $r_7=2.4702$ | $d_6=0.04$ | | |
| $r_8=-4.2637$ | $d_7=0.4279$ | $N_4=1.7106$ | $V_4=43.3$ |
| $r_9=2.5309$ | $d_8=0.009$ | | |
| $r_{10}=10.6383$ | $d_9=0.5000$ | $N_5=1.7847$ | $V_5=25.7$ |
| $r_{11}=\infty$ | $d_{10}=0.1$ | | |
| $r_{12}=\infty$ | $d_{11}=0.0929$ | $N_6=1.5994$ | $V_6=40.8$ |
| $r_{13}=-1.5145$ | $d_{12}=0.3007$ | | |
| $r_{14}=-0.7029$ | $d_{13}=0.2629$ | $N_7=1.6425$ | $V_7=58.1$ |
| $r_{15}=-0.6344$ | $d_{14}=0.06$ | | |
| $r_{16}=-1.4149$ | $d_{15}=0.15$ | $N_8=1.7557$ | $V_8=27.2$ |
| $r_{17}=-5.1808$ | $d_{16}=0.009$ | | |
| $r_{18}=1.6218$ | $d_{17}=0.085$ | $N_9=1.7400$ | $V_9=37.5$ |
| $r_{19}=-1.8597$ | $d_{18}=0.42$ | $N_{10}=1.5891$ | $V_{10}=61.2$ |
| $r_{20}=4.4936$ | $d_{19}=0.009$ | | |
| $r_{21}=-2.0515$ | $d_{20}=0.43$ | $N_{11}=1.6000$ | $V_{11}=64.1$ |
| | $\Sigma d=4.2289$ | | | a fourth lens of the biconvex type,
a fifth lens of the convergent type having its convex surface facing the object,
a sixth element is a filter,
a seventh lens of the convergent meniscus lens type having its convex surface facing the image,
an eighth lens of the divergent meniscus type having its convex surface facing the image,

| Radii of curvature | Axial separations | Refractive indices | Abbé numbers |
|---|---|---|---|
| $r_1=7.6587$ | | | |
| $r_2=1.1846$ | $d_1=0.13$ | $N_1=1.6204$ | $V_1=60.3$ |
| $r_3=2.5078$ | $d_2=0.4889$ | | |
| $r_4=1.0494$ | $d_3=0.12$ | $N_2=1.6204$ | $V_2=60.3$ |
| $r_5=-2.6996$ | $d_4=0.4779$ | | |
| $r_6=6.4885$ | $d_5=0.1$ | $N_3=1.6204$ | $V_3=60.3$ |
| $r_7=4.5007$ | $d_6=0.04$ | | |
| $r_8=-3.0057$ | $d_7=0.4151$ | $N_4=1.6645$ | $V_4=35.9$ |
| $r_9=2.1925$ | $d_8=0.009$ | | |
| $r_{10}=347.222$ | $d_9=0.4722$ | $N_5=1.7330$ | $V_5=28.2$ |
| $r_{11}=\infty$ | $d_{10}=0.1$ | | |
| $r_{12}=\infty$ | $d_{11}=0.0933$ | $N_6=1.5994$ | $V_6=40.8$ |
| $r_{13}=-1.6272$ | $d_{12}=0.2983$ | | |
| $r_{14}=-0.6060$ | $d_{13}=0.3413$ | $N_7=1.6214$ | $V_7=61.2$ |
| $r_{15}=-0.6060$ | $d_{14}=0$ | | |
| $r_{16}=-1.3364$ | $d_{15}=0.1481$ | $N_8=1.7330$ | $V_8=28.2$ |
| $r_{17}=-9.5039$ | $d_{16}=0.009$ | | |
| $r_{18}=1.5755$ | $d_{17}=0.085$ | $N_9=1.7400$ | $V_9=37.5$ |
| $r_{19}=-1.9997$ | $d_{18}=0.415$ | $N_{10}=1.5688$ | $V_{10}=56.0$ |
| $r_{20}=3.3016$ | $d_{19}=0.009$ | | |
| $r_{21}=-4.1338$ | $d_{20}=0.265$ | $N_{11}=1.5168$ | $V_{11}=64.2$ |
| | $\Sigma d=4.0172$ | | | a ninth lens of the divergent type,
a 10th lens of the biconvex type,
an 11th lens of the convergent type,
wherein the indicated lens elements have the following characteristics,
wherein $r_1, r_2...r_{21}$ are defined as the radii of curvature of the refracting surfaces as indicated in FIG. 1,
$d_1, d_2...d_{20}$ are defined as the axial separations between consecutive refracting surfaces as indicated in FIG. 1,
$N_1, N_2...N_{11}$ are defined as the refractive indices of the respective lens elements, and
$V_1, V_2...V$ are the Abbe numbers of the respective lens elements, and
the back focal distance is 2.28.

2. A wide-angle lens system having a focal length of 1.0, a focal aperture of 1:2.8, a field angle of 180° and 11 elements successively mounted from the object side comprising;
first and second lenses of the divergent meniscus type each having its convex surface facing the object,
a third lens of the divergent type,
a fourth lens of the biconvex type,
a fifth lens of the convergent type having its convex surface facing the object,
a sixth element is a filter,
a seventh lens of the convergent meniscus lens type having its convex surface facing the image,
an eighth lens of the divergent meniscus type having its convex surface facing the image,
a ninth lens of the divergent type,
a 10th lens of the biconvex type,
an 11th lens of the convergent type,
wherein the indicated lens elements have the following characteristics,

| Radii of curvature | Axial separations | Refractive indices | Abbé numbers |
|---|---|---|---|
| $r_1=7.5832$ | | | |
| $r_2=1.1870$ | $d_1=0.13$ | $N_1=1.6204$ | $V_1=60.3$ |
| $r_3=2.4787$ | $d_2=0.4909$ | | |
| $r_4=1.0464$ | $d_3=0.12$ | $N_2=1.6176$ | $V_2=52.7$ |
| $r_5=-2.7105$ | $d_4=0.4784$ | | |
| $r_6=4.2057$ | $d_5=0.1$ | $N_3=1.6205$ | $V_3=60.3$ |
| $r_7=4.2057$ | $d_6=0$ | | |
| $r_8=-3.2290$ | $d_7=0.4701$ | $N_4=1.7495$ | $V_4=34.9$ |
| $r_9=2.1747$ | $d_8=0.009$ | | |
| $r_{10}=\infty$ | $d_9=0.4745$ | $N_5=1.7330$ | $V_5=28.2$ |
| $r_{11}=\infty$ | $d_{10}=0.1$ | | |
| $r_{12}=\infty$ | $d_{11}=0.0933$ | $N_6=1.5994$ | $V_6=40.8$ |
| $r_{13}=-1.7075$ | $d_{12}=0.2981$ | | |
| $r_{14}=-0.6079$ | $d_{13}=0.3381$ | $N_7=1.6214$ | $V_7=61.2$ |
| $r_{15}=-0.6079$ | $d_{14}=0$ | | |
| $r_{16}=-1.3408$ | $d_{15}=0.1481$ | $N_8=1.7330$ | $V_8=28.2$ |
| $r_{17}=-8.0756$ | $d_{16}=0.009$ | | |
| $r_{18}=1.6141$ | $d_{17}=0.085$ | $N_9=1.7400$ | $V_9=37.5$ |
| $r_{19}=-2.0450$ | $d_{18}=0.395$ | $N_{10}=1.5688$ | $V_{10}=56.0$ |
| $r_{20}=3.3647$ | $d_{19}=0.009$ | | |
| $r_{21}=-3.5348$ | $d_{20}$ $0.285$ | $N_{11}=1.5168$ | $V_{11}=64.2$ |
| | $\Sigma d=4.0336$ | | | wherein $r_1, r_2...r_{21}$ are defined as the radii of curvature of the refracting surfaces as indicated in FIG. 2,
$d_1, d_2...d$ are defined as the axial separations between consecutive refracting surfaces as indicated in FIG. 2,
$N_1, N_2...N$ are defined as the refractive indices of the respective lens elements, and
$V_1, V_2...V$ are the Abbe numbers of the respective lens elements, and
the back focal distance is 2.27.

3. A wide-angle lens system having a focal length of 1.0, a focal aperture of 1:2.8, a field angle of 180° and 11 elements successively mounted from the object side comprising:
first and second lenses of the divergent meniscus type each having its convex surface facing the object,
a third lens of the divergent type,
a fourth lens of the biconvex type,
a fifth lens of the convergent type having its convex surface facing the object,
a sixth element is a filter,
a seventh lens of the convergent meniscus lens type having its convex surface facing the image,
an eighth lens of the divergent meniscus type having its convex surface facing the image,
a ninth lens of the divergent type,
a 10th lens of the biconvex type,
an 11th lens of the convergent type,
wherein the indicated lens elements have the following characteristics,

| Radii of curvature | Axial separations | Refractive indices | Abbé numbers |
|---|---|---|---|
| $r_1=7.4599$ | | | |
| $r_2=1.1542$ | $d_1=0.13$ | $N_1=1.6000$ | $V_1=64.1$ |
| $r_3=2.4737$ | $d_2=0.5029$ | | |
| $r_4=1.0536$ | $d_3=0.12$ | $N_2=1.6204$ | $V_2=60.3$ |
| $r_5=-2.7204$ | $d_4=0.4796$ | | |
| $r_6=17.2533$ | $d_5=0.1$ | $N_3=1.6204$ | $V_3=60.3$ |
| $r_7=2.4702$ | $d_6=0.04$ | | |
| $r_8=-4.2637$ | $d_7=0.4279$ | $N_4=1.7106$ | $V_4=43.3$ |
| $r_9=2.5309$ | $d_8=0.009$ | | |
| $r_{10}=10.6383$ | $d_9=0.5000$ | $N_5=1.7847$ | $V_5=25.7$ |
| $r_{11}=\infty$ | $d_{10}=0.1$ | | |
| $r_{12}=\infty$ | $d_{11}=0.0929$ | $N_6=1.5994$ | $V_6=40.8$ |
| $r_{13}=-1.5145$ | $d_{12}=0.3007$ | | |
| $r_{14}=-0.7029$ | $d_{13}=0.2629$ | $N_7=1.6425$ | $V_7=58.1$ |
| $r_{15}=-0.6344$ | $d_{14}=0.06$ | | |
| $r_{16}=-1.4149$ | $d_{15}=0.15$ | $N_8=1.7557$ | $V_8=27.2$ |
| $r_{17}=-5.1808$ | $d_{16}=0.009$ | | |
| $r_{18}=1.6218$ | $d_{17}=0.085$ | $N_9=1.7400$ | $V_9=37.5$ |
| $r_{19}=-1.8597$ | $d_{18}=0.42$ | $N_{10}=1.5891$ | $V_{10}=61.2$ |
| $r_{20}=4.4936$ | $d_{19}=0.009$ | | |
| $r_{21}=-2.0515$ | $d_{20}=0.43$ | $N_{11}=1.6000$ | $V_{11}=6.41$ |
| | $\Sigma d=4.2289$ | | | wherein $r_1, r_2...r_{21}$ are defined as the radii of curvature of the refracting surfaces as indicated in FIG. 3,
$d_1, d_2...d_{20}$ are defined as the axial separations between consecutive refracting surfaces as indicated in FIG. 3,
$N_1, N_2...N$ are defined as the refractive indices of the respective lens elements, and
$V_1, V_2...V$ are the Abbe numbers of the respective lens elements, and
the back focal distance is 2.19.